US011037105B2

(12) United States Patent
Roy et al.

(10) Patent No.: US 11,037,105 B2
(45) Date of Patent: Jun. 15, 2021

(54) RETIREMENT SCORE CALCULATOR

(71) Applicants: Rohit J. Roy, Basking Ridge, NJ (US); Riya J. Roy, Basking Ridge, NJ (US)

(72) Inventors: Rohit J. Roy, Basking Ridge, NJ (US); Riya J. Roy, Basking Ridge, NJ (US)

(73) Assignees: Rohit J. Roy, Basking Ridge, NJ (US); Riya J. Roy, Basking Ridge, NJ (US)

( * ) Notice: Subject to any disclaimer, the term of this patent is extended or adjusted under 35 U.S.C. 154(b) by 933 days.

(21) Appl. No.: 15/179,280

(22) Filed: Jun. 10, 2016

(65) Prior Publication Data
US 2017/0200126 A1    Jul. 13, 2017

Related U.S. Application Data

(60) Provisional application No. 62/276,956, filed on Jan. 10, 2016.

(51) Int. Cl.
*G06Q 40/00* (2012.01)
*G06Q 10/10* (2012.01)
*H04L 29/06* (2006.01)

(52) U.S. Cl.
CPC ..... *G06Q 10/1057* (2013.01); *H04L 63/0428* (2013.01)

(58) Field of Classification Search
USPC ............... 705/39, 37, 38, 36, 40, 26.4, 27.1; 700/245; 706/25, 45; 719/328, 315; 717/108; 709/226, 227; 715/704, 708; 726/196; 318/611; 463/25, 20; 235/375, 235/380, 383; 340/540
See application file for complete search history.

(56) References Cited

U.S. PATENT DOCUMENTS

| | | | | |
|---|---|---|---|---|
| 7,634,436 B1 * | 12/2009 | Wagner | .................. | G06Q 40/00 705/35 |
| 8,275,638 B1 * | 9/2012 | Luedtke | ............. | G06Q 10/1057 705/4 |
| 8,930,217 B2 * | 1/2015 | Feinschreiber | ........ | G06Q 40/00 705/2 |
| 10,915,959 B2 * | 2/2021 | Sokol | ...................... | H04W 4/02 |

(Continued)

OTHER PUBLICATIONS

Sankaliya et al., "Implimentation of Cryptographic Algorithm for GSM and UMTS Systems", Nov. 2011, International Journal of Network Security & Its Applications (IJNSA), vol. 3, No. 6, p. 1 (Year: 2011).*

(Continued)

*Primary Examiner* — Tien C Nguyen
(74) *Attorney, Agent, or Firm* — Leason Ellis LLP

(57) ABSTRACT

The present invention concerns a system for optimizing employee retirement contributions comprising an optimization computer having one or more processors configured by code executing therein to access data from one or more retirement plan participants and derive, based on the accessed data, a hierarchy of proposals to maximize one or more features of the retirement account and to transmit such a derived hierarchy, and using a remote device configured to receive the hierarchy of retirement proposals and to generate in response to the transmission, a plurality of graphical elements, each graphical element corresponding to a particular strategy.

18 Claims, 8 Drawing Sheets

(56) References Cited

U.S. PATENT DOCUMENTS

| | | | | |
|---|---|---|---|---|
| 2002/0194251 | A1* | 12/2002 | Richter | G06F 9/5011 718/105 |
| 2005/0197857 | A1* | 9/2005 | Avery | G06Q 40/025 705/26.1 |
| 2009/0171776 | A1* | 7/2009 | Scipioni | G06Q 30/02 705/14.18 |
| 2010/0153298 | A1* | 6/2010 | Fulshaw | G06Q 10/10 705/36 R |
| 2013/0191141 | A1* | 7/2013 | Chun | G06Q 50/22 705/2 |
| 2014/0279327 | A1* | 9/2014 | Keyes | G06Q 40/02 705/35 |
| 2014/0379611 | A1* | 12/2014 | Goldman | G06Q 10/1057 705/36 R |
| 2015/0178846 | A1* | 6/2015 | Feinschreiber | G06Q 40/06 705/36 R |

OTHER PUBLICATIONS

Great-West Life & Annuity Insurance Company, "County of Los Angeles 401(k) Savings Plan", 2011, Great-West Life & Annuity Insurance Company, pp. 1-5 (Year: 2011).*

Houghton Mifflin Company, "install", Nov. 29, 2004, The Free Online Dictionary, http://web.archive.org/web/20100522212832/ https://www.thefreedictionary.com/install, p. 1 of PDF document (Year: 2004).*

Now: Pensions, "Contribution schedule", Jul. 4, 2014, Now: Pensions, http://web.archive.org/web/20140704041834/https://www. nowpensions.com/glossary/contribution-schedule/, p. 1 of PDF document (Year: 2011).*

Ashlea Ebeling, "The Big 401(k) Match Mistake", Jan. 13, 2012, Forbes, http://web.archive.org/web/20120113210149/https://www. forbes.com/sites/ashleaebeling/2012/01/13/the-big-401k-match-mistake/#, pp. 1 and 2 of PDF document. (Year: 2012).*

Trent Hamm, "Increasing Your 401(k) Contributions: Benefits and Drawbacks", Jul. 31, 2014, The Simple Dollar, https://www. thesimpledollar.com/increasing-your-401k-contributions-benefits-and-drawbacks/, pp. 1 and 2 of PDF document. (Year: 2014).*

Participatory business process reengineering design: generating solutions; SCCC 2001. 21st International Conference of the Chilean Computer Science Society (pp. 13-22); F. Albano, J.A. Pino, M.R.S. Borges, Jan. 1, 2001 . . . (Year: 2001).*

Your Investment Plan; Engineering Your Retirement: Retirement Planning for Technology Professionals; Mike Golio; Jan. 1, 2007 . . . (Year: 2007).*

* cited by examiner

| Input Data (Employee and Employer Information) From User | Description | Example |
|---|---|---|
| Annual Compensation | Total eligible compensation for the year. This typically includes salary, bonus, commissions | $120,000 |
| How Often The Employee Is Paid | This is the payment cycle. Typical values can include Weekly, Bi-Weekly, Monthly, Bi-Monthly, Annually | Bi-Weekly |
| Number Of Pay Checks Remaining For The Year | Number of pay checks that are remaining for the rest of the year | 8 |
| YTD Employee Contribution | Year-to-date contribution made by the employee | $5,000 |
| Current Employee Contribution Rate | Current rate of contribution made by the employee | 3% |
| YTD Employer Matching Contribution | Year-to-date matching contribution made by the employer | $5,000 |
| Current Employer Match Rate | Current rate of matching contribution provided by employer | 3% |
| Max Employer Match Rate | Maximum rate of matching contribution that can be provided by employer | 6% |
| YTD Employer Nonelective Contribution | Year-to-date nonelective contribution made by the employer. This typically include any profit sharing contribution made by the employer. | $5,000 |
| Employee Age >= 50 During the Year | Will the employee be 50 years old or above during the year | 'Y' or 'N' |
| Employee Federal Tax Rate | Federal tax rate of the employee | 25% |
| Employee State Tax Rate | State tax rate of the employee | 7% |
| Score Calculation Year | Year used for the calculations | 2015 |
| Employer Name | Name of the employer | Company A |
| Type of Retirement Plan | Type of retirement plan | Traditional 401(k) Plan |
| Plan Permits Catch-up Contributions | Does the retirement plan permits catch-up contributions for employees old 50 years or above | 'Y' or 'N' |

| Year | Type of Retirement Plan | Employee Elective Deferral Limit (Specified by IRS) | Catch-up Contribution Limit (Specified by IRS) | Overall Contribution Limit (Employee + Employer) (Specified by IRS) | Annual Compensation Limit (Specified by IRS) |
|---|---|---|---|---|---|
| 2013 | Traditional 401(k) Plan | $17,000 | $5,500 | $51,000 | $255,000 |
| 2014 | Traditional 401(k) Plan | $17,500 | $5,500 | $52,000 | $260,000 |
| 2015 | Traditional 401(k) Plan | $18,000 | $6,000 | $53,000 | $265,000 |
| 2016 | Traditional 401(k) Plan | $18,000 | $6,000 | $53,000 | $265,000 |
| ... | ... | | | | |
| 2013 | Safe Harbor 401(k) Plan | $17,000 | $5,500 | $51,000 | $255,000 |
| 2014 | Safe Harbor 401(k) Plan | $17,500 | $5,500 | $52,000 | $260,000 |
| 2015 | Safe Harbor 401(k) Plan | $18,000 | $6,000 | $53,000 | $265,000 |
| 2016 | Safe Harbor 401(k) Plan | $18,000 | $6,000 | $53,000 | $265,000 |
| ... | ... | | | | |
| 2013 | 403(b) Plan | $17,000 | $5,500 | $51,000 | $255,000 |
| 2014 | 403(b) Plan | $17,500 | $5,500 | $52,000 | $260,000 |
| 2015 | 403(b) Plan | $18,000 | $6,000 | $53,000 | $265,000 |
| 2016 | 403(b) Plan | $18,000 | $6,000 | $53,000 | $265,000 |
| ... | ... | | | | |
| 2013 | 457 Plan | $17,000 | $5,500 | $51,000 | $255,000 |
| 2014 | 457 Plan | $17,500 | $5,500 | $52,000 | $260,000 |
| 2015 | 457 Plan | $18,000 | $6,000 | $53,000 | $265,000 |
| 2016 | 457 Plan | $18,000 | $6,000 | $53,000 | $265,000 |
| ... | ... | | | | |
| 2013 | Thrift Savings Plan | $17,000 | $5,500 | $51,000 | $255,000 |
| 2014 | Thrift Savings Plan | $17,500 | $5,500 | $52,000 | $260,000 |
| 2015 | Thrift Savings Plan | $18,000 | $6,000 | $53,000 | $265,000 |
| 2016 | Thrift Savings Plan | $18,000 | $6,000 | $53,000 | $265,000 |

| Score Range | Letter Grade | H/M/L Score | R/A/G Color Score |
|---|---|---|---|
| 97-100 | A+ | High | Green |
| 93-96 | A | High | Green |
| 90-92 | A- | High | Green |
| 87-89 | B+ | Medium | Amber |
| 83-86 | B | Medium | Amber |
| 80-82 | B- | Medium | Amber |
| 77-79 | C+ | Low | Red |
| 73-76 | C | Low | Red |
| 70-72 | C- | Low | Red |
| 67-69 | D+ | Low | Red |
| 63-66 | D | Low | Red |
| 60-62 | D- | Low | Red |
| 0-59 | E | Low | Red |

FIG. 5

| Employer Name | Type of Retirement Plan | Employee Contribution Rate | Corresponding Employer Match Rate | Employer Match Limit | Waiting Period To Receive Employer Match | Employer Provides Match For Catchup Contribution | Employer Has Age Based Rules For Matching | Employer Has Tenure Based Rule For Matching |
|---|---|---|---|---|---|---|---|---|
| Company A | Traditional 401(k) Plan | 1% | 3% | $0 | 0 days | Yes | No | No |
| Company A | Traditional 401(k) Plan | 2% | 4% | $0 | 0 days | Yes | No | No |
| Company A | Traditional 401(k) Plan | 3% | 5% | $0 | 0 days | Yes | No | No |
| Company A | Traditional 401(k) Plan | >=4% | 6% | $0 | 0 days | Yes | No | No |
| Company B | Traditional 401(k) Plan | 1% | 0.50% | $10,000 | 12 months | No | Yes | Yes |
| Company B | Traditional 401(k) Plan | 2% | 1% | $10,000 | 12 months | No | Yes | Yes |
| Company B | Traditional 401(k) Plan | 3% | 1.50% | $10,000 | 12 months | No | Yes | Yes |
| Company B | Traditional 401(k) Plan | 4% | 2% | $10,000 | 12 months | No | Yes | Yes |
| Company B | Traditional 401(k) Plan | 5% | 2.50% | $10,000 | 12 months | No | Yes | Yes |
| Company B | Traditional 401(k) Plan | >=6% | 3% | $10,000 | 12 months | No | Yes | Yes |

FIG. 6

RETIREMENT SCORE CALCULATOR

CROSS REFERENCE TO RELATED APPLICATION

The present application claims the benefit of U.S. patent application Ser. No. 62/276,956, filed Jan. 10, 2016, which is hereby incorporated by reference in its entirety.

FIELD OF THE INVENTION

The present invention relates generally to a computer-based method and system for calculating employee retirement scores and generating implementable action plans to maximize retirement benefits in response thereto.

BACKGROUND OF THE INVENTION

There are various retirement plans in the US such as the 401(k) plan, 403(b) plan, 457 plan, Thrift Savings Plan etc. that allow an employee to elect to have the employer contribute a portion of the employee's cash wages to the plan on a pre-tax basis. These elective deferrals are not subject to income tax withholding at the time of deferral and they are not reflected as taxable income on the income tax return. For example, an employee can elect to contribute 10% of the compensation from every paycheck he/she receives to his/her 401(k) account on a pre-tax basis.

Another key benefit of some of these retirement plans is the matching contribution provided by most employers. For example, as long as the employee makes a contribution, the employer may make a matching contribution up to a certain percentage. As an example, the employer gives a matching contribution of $1 for each dollar the employee contributes for up to 6% of compensation.

There is a limit to the maximum amount of money that can be contributed by an employee for any given year. This contribution limit usually varies by year depending on inflation and is set by the IRS. For example, under a 401(k) plan for the year 2015, an employee can contribute up to $18,000 in pre-tax money. During the year, if the employee is aged 50 or above, then that employee is eligible to contribute an additional $6000 in pre-tax money as catch-up contribution. Additionally, the total employee and employer contributions are limited to the lesser of an employee's compensation or $53,000 for 2015.

Although retirement plans such as 401(k) plans are extremely popular, employees are often not aware of the maximum amount they can contribute for the year, thereby missing out on availing maximum tax savings for the year. Additionally, employees are often not aware that they are leaving free money on the table. This happens when an employee do not contribute at all or do not contribute enough to get the maximum matching contribution from the employer, thus missing out on the free money provided by the employer. Another interesting and often overlooked case is even if an employee contributes up to the maximum contribution limit for the year and gets matching contribution from the employer, the employee may not be aware that he or she is still not getting the "maximum" matching contribution from the employer and leaving free money on the table. This occurs when the employee contributes too much money initially during the year and reaches the employee contribution limit early in the year. Since the employee is not permitted to contribute to the plan once the contribution limit for the year has been reached before the end of the year, for every subsequent paycheck thereafter the employee is not able to make a contribution, the employee misses out on the corresponding matching contribution from the employer, thereby not getting the maximum "matching" contribution from the employer.

Employees generally rely on online or printed account statements provided by their employers or plan administrators to get information about their retirement accounts. These statements typically provide information such as how much money they have contributed, how much money the employer has contributed, which financial instruments the money is invested in, how the investments are performing etc. These statements do not by themselves provide employees with direct information on whether they are maximizing their tax savings or maximizing their employer matching contributions for the year. Financial Engines article published in May 2015 estimates that employees are passing up approximately $24 billion annually in employer matching contributions by not saving enough to receive their full employer 401(k) match.

Therefore, what is needed is a system and method that automatically determines the optimal retirement savings strategy based on the unique combination of factors present so as to not leave free money on the table. Furthermore, what is needed is a system and method that, without user input, quantifies the level of an employee's contribution as well as the matching contribution that can be obtained from the employer so as to assist in maximizing the employee's retirement savings. Additionally, what is needed is a system and method that generates and transmits actionable recommendations to the employee, such actionable recommendations providing the employee with discrete options relating to changes in allocations that will obtain optimal retirement plan outcomes and to maximize tax savings, including obtaining the maximum contribution match from the employer.

SUMMARY OF THE INVENTION

The present invention discloses a computer-based method and system for calculating employee retirement scores and devising recommendations for maximizing retirement benefits. Accordingly, building awareness and helping employees by providing meaningful information and insights in an easy to understand form, scores that quantify the level of their own contribution (relative to the maximum allowable under law), the level of matching contribution expected to be received from the employer (relative to the maximum matching contribution that can be obtained from the employer for the year), as well as overall scores and recommendations on how to improve scores and maximize retirement benefits are embodied in the present invention. For example, the present invention is directed, in part, to calculating the following metrics for use in implementing the procedures and work flows described herein.

Employee Contribution Score (ECS)—a metric that quantifies how the employee is doing in terms of his own contribution relative to the maximum allowable under law. This will help determine whether the employee is contributing the maximum allowable for a particular year thereby availing full advantage of the tax benefit offered by the government.

Employer Match Score (EMS)—a metric that quantifies the level of matching contribution provided the employer. This will help indicate whether the employee is availing the maximum matching contribution from the employer or whether the employee is leaving any free money on the table.

Composite Scores (CS)—a metric that provides the arithmetic average and/or weighted averages of the two scores above that represent the Composite/Combined/Overall Score for the employee. This can be thought of as something similar to a credit score provided by the credit rating agencies In an exemplary embodiment under the invention, the scores range from 0-100. But the scores can be represented in many different numeric ranges or many different modes of ranges viz. as letter grades such as A+, A, A−, B+, B, B− etc., descriptions such as High/Medium/Low etc., descriptions such as Excellent/Good/Poor etc., descriptions or colors such as Red/Amber/Green etc.

According to the present invention, recommendations on how to improve the scores are also disclosed. In this sense, the present invention not only provides scores that are descriptive of the current situation of an employee but also prescriptive in terms of how to improve their current situation.

In one particular and non-limiting embodiment of the system and methods described, a properly configured computer executing code therein implements the steps of providing a contribution optimization application to a retirement plan participant for installation on a wireless computing device.

A retirement optimization computer is configured to receive input providing at least participant data, a contribution limit for the participant that specifies a total amount the participant may contribute to a tax-savings retirement account, a current contribution amount that specifies the total amount that the participant has contributed to a retirement account for the current year, a matching limit for the participant that specifies the maximum amount that the participant's employer will match a contribution to the retirement account of the participant for the current year and a current matching amount that specifies the matching amount that the employer has already contributed to the retirement account of the participant for the current year. The computer is further configured by code to implement a step of generating at least one contribution maximization value corresponding to the differential between the maximum employee matching funds and the amount of funds presently contributed to the retirement account by the employer and at least one tax savings maximization value being derived from at least a comparison of total amount permitted in a tax-savings retirement account and the current amount contributed to the retirement account by the employee.

Using this information, at least one contribution strategy is devised by the processor to achieve a participant goal, wherein the participant goal includes at least one of (i) minimizing the contribution maximization value, (ii) minimizing the tax savings maximization value, or (iii) balancing (i) and (ii) so as to achieve the minimal possible value for both (i) and (ii), wherein the computing device is further configured to rank the devised strategies based on the participant data. The computer is further configured to transmit the contribution strategy to the wireless device over the Internet using a wireless communication channel.

The wireless or remote device is configured to generate, on a display connected thereto, a graphical representation that visually depicts (i) each of the contribution strategies, (ii) a graphical indicator identifying the rank of each strategy relative to one another. The wireless device is further configured to associate with the wireless device, a resource link associated with each contribution strategy, selection of the link causing the wireless device to send one or more instructions to the computing device to implement the selected contribution strategy.

BRIEF DESCRIPTION OF THE DRAWINGS

The above and other features, aspects, and advantages of the present invention will become more fully understood from the following detailed description, taken in conjunction with the accompanying drawings/figures in which:

FIG. 2 is a table illustrating input data supplied by a user for getting scores and recommendations according to an exemplary embodiment under the invention.

FIG. 4 is an exemplary table illustrating IRS rules related to contribution limits and annual compensation limits for various years, as stored in the computer-system database.

FIG. 5 is a table illustrating numeric scores and the corresponding letter grade, High/Medium/Low score, and Red/Amber/Green score mappings, as stored in the computer-system database according to an embodiment under the invention.

FIG. 6 is a table showing the company name, type of retirement plan, employee contribution rate, and the corresponding employer match rate and employer match limit according to an exemplary embodiment under the invention.

DETAILED DESCRIPTION OF THE INVENTION

By way of overview and introduction, the method and system described are directed to, in one embodiment, determining an Employee Contribution Score (ECS), Employer Match Score (EMS), and Combined Scores (CS) and to provide actionable recommendations on how to improve the scores by optimizing the employee's contribution and employer's matching contribution for retirement plans such as the 401(k) retirement plan.

For ease of explanation and discussion, the following detailed description addresses the system and method in terms of evaluating a traditional 401(k) plan. However, those possessing an ordinary level of skill in the requisite art will appreciate that the systems and methods described are in no way limited to traditional 401(k) plan and can be applied to other retirement plans including, but not limited to, Safe Harbor 401(k) plans, SIMPLE 401(k) plans, 403(b) plans, 457 plans, Thrift Savings plans and any other similar type of retirement plans.

It is seen that retirement plans such as 401(k) plans where employees make pre-tax contributions from their salary and employers provide matching contributions have become extremely prevalent these days. Although popular, it has been found that employees do not take maximum advantage of the benefits offered by these plans. Sometimes they do not contribute enough to avail maximum tax savings allowed under law or receive maximum matching contributions from the employer. Sometimes they contribute too much and reach the contribution limit before the end of the year resulting in that they miss out on getting the maximum matching contributions from the employer. Various embodiments of computer-based methods and systems of the present invention are described below. Numerous specific details are set forth to provide a thorough understanding of the overall structure, function, and use of the embodiments.

Figure 1A:
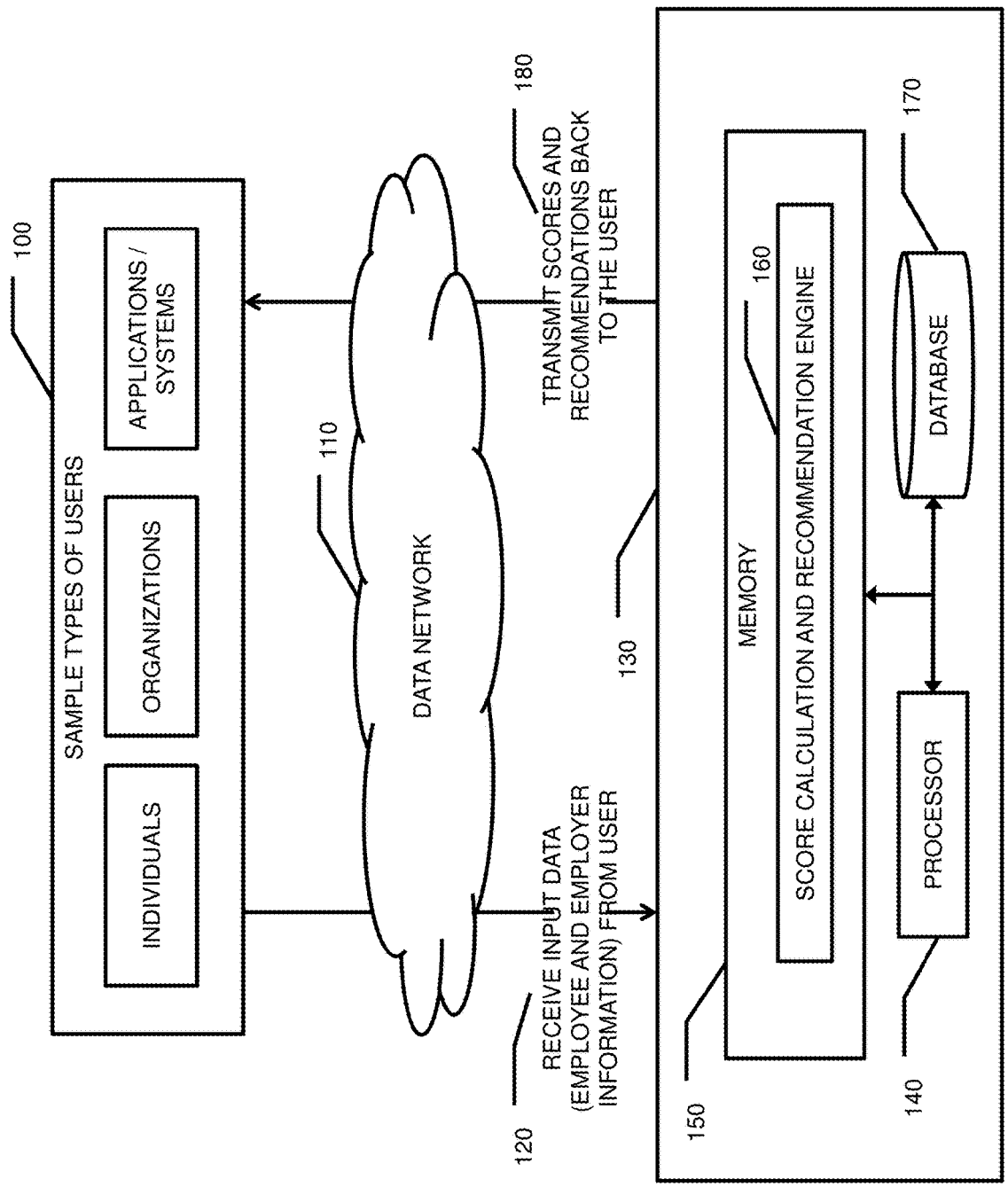
FIG. 1A is a block diagram depicting a computer system according to the present invention.

With reference to one or more embodiments, and as detailed in FIG. 1A, a properly configured computer system 130 is configured to implement a series of instructions, to effectuate a contribution optimization application for use in evaluating contribution data and generating contribution strategies in response to the evaluated data.

Once the strategies have been generated, they are sent to a remote or mobile platform 190 via a communication channel over a network 110. The generated strategies are displayed to a user for selection.

Figure 1B:
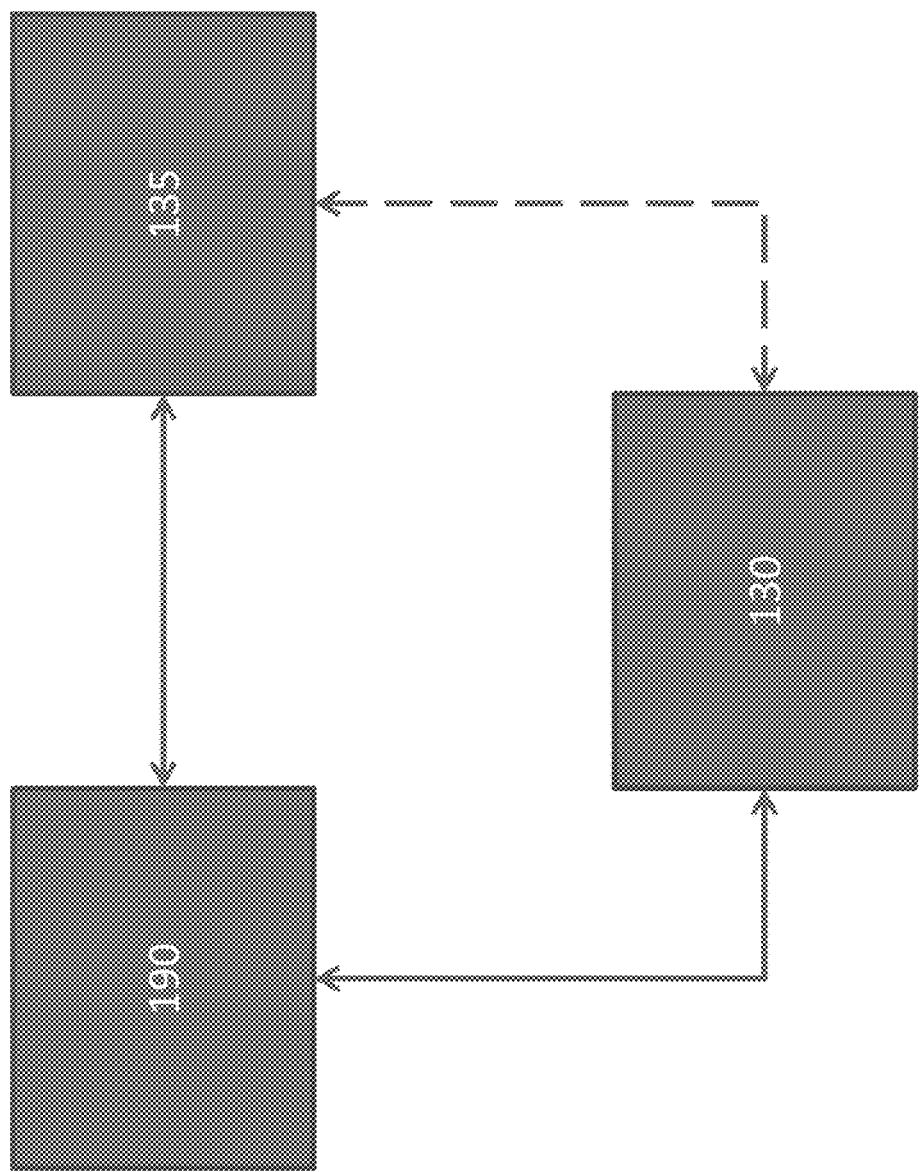
FIG. 1B is a block diagram depicting a computer system according to a further embodiment of the present invention.

As shown in more detail with respect to FIG. 1B, upon selection by a user, the strategies are effectuated by directly accessing one or more account servers 135, and altering one or more variables associated with the participant, such alterations implemented to effectuate the strategy.

In one embodiment of the system described, a computer or processor system 130, configured by one or more modules executing therein, accesses a collection of user data, tax data and employer data from one or more data stores and calculates scores such as Employee Contribution Score (ECS), Employer Matching Score (EMS) and Composite Scores (CS) that quantify the level of contribution made by an employee to a retirement plan, the level of matching contribution provided by the employer, and overall optimization of tax strategies. Additionally, upon scoring the user on optimization effectiveness, the processor is further configured to transmit to the user an actionable improvement plan that provides the user with one or more options on improving the one or more calculated scores.

Turning to FIG. 1A, a block diagram is provided detailing the interconnections of and between the computer-based system 130 in accordance with one embodiment of the present invention. The computer-based system 130 (sometimes referred to herein simply as "computer system" or "system") may comprise of one or more networked, electronic computer devices such as servers, personal computers, workstations, mainframes, laptops, handheld and/or mobile computing devices. As shown in FIG. 1A, the computer system may comprise of one or more processor circuits 140, one or more memory units 150, and one or more databases 170. For convenience, only one processor circuit (referred to hereinafter simply as "processor") 140, one memory unit 150, and one database 170 are shown in FIG. 1A.

In a non-limiting example, the computer system 130 and remote computer 190 are commercially available or custom built computers equipped with one or more processors, graphical processing units, field programmable gate arrays, RAM and ROM memory, network interface adaptors and one or more input or output devices. In a further embodiment, the computer system 130 or remote computer 190 is a computer server or collection of computer servers, each server configured to store, access, process, distribute or transmit data between one another and other computers or devices accessible or connectable therewith. In still a further embodiment, computer system 130 or remote computer 190 is a hosted server, virtual machine, or other collection of software modules or programs that are interrelated and hosted in a remote accessible storage device (e.g. cloud storage and hosting implementation) that allows for dynamically allocated additional processors, hardware or other resources on an "as-need" or elastic need basis. In a further embodiment, the processor is configured to implement elastic load balancing algorithms to harness remote computing capacity or functionality to enable the system to handle computationally or otherwise resource intensive actions and procedures.

In a particular arrangement, the computer system 130 or remote computer 190 is a desktop or workstation computer using a commercially available operating system, e.g. Windows®, OSX®, UNIX or Linux based implementation. In a further configuration, the computer system 130 or remote computer 190 is a portable computing device such as an Apple IPad/IPhone® or Android® device or other commercially available mobile electronic device configured to have access to or implement remote hardware as necessary to carry out the functions described. In other embodiments, the computer system 130 or remote computer 190 includes custom or non-standard hardware configurations. For instance, the computer system 130 or remote computer 190 is a one or more micro-computer(s) operating alone or in concert within a collection of such devices, network(s), or array of other micro-computing elements, computer-on-chip(s), prototyping devices, "hobby" computing elements, home entertainment consoles and/or other hardware.

The memory 150 may store a number of software modules, such as the score calculation and recommendation engine 160 shown in FIG. 1. The module 160 may comprise software code that is executed by the processor 140, the execution of which causes the processor 140 to perform various actions dictated by the software code of the various modules, as explained further below. The processor 140 may have one or multiple cores. The memory 150 may comprise primary computer memory, such as a read only memory (ROM) and/or a random access memory (e.g., a RAM). The memory could also comprise secondary computer memory, such as magnetic or optical disk drives or flash memory, for example.

The database 170 may be implemented as computer databases, files, directories, or any other system suitable for storing data for use by computers. The database 170 may be embodied as solid-state memory (e.g., ROM), hard disk drive systems, RAID, disk arrays, storage area networks (SANs), network attached storage (NAS) and/or any other suitable system for storing computer data. In addition, the database 170 may comprise caches, including database caches and/or web caches.

Embodiments of the computer system may also be implemented in cloud computing environments. In this embodiment, "cloud computing" may be defined as a model for enabling ubiquitous, on-demand network access to a shared pool of configurable computing resources that can include networks, servers, storage, applications, and services that can be rapidly provisioned and released with minimal management effort.

As shown in FIG. 1A, in one embodiment, typical users 100 of the computer system 130 can be individuals, institutions and/or other applications or systems. Individuals, for example, can include employees, spouses of employees, human resources staff at employers, staff at retirement plan administrators, financial advisors, accountants, tax professionals etc. Institutions can include employers, plan administrators, financial services firms, tax advisory firms and such. The users of the computer system can also be other applications or third-party systems such as retirement planning systems/wealth management systems/portfolio management systems/online account information websites of employers and/or retirement plan administrators/mobile applications offered by the institutions indicated above. The users can also be computer batch programs or scripts.

Users can interact with the computer system via a graphical user interface (GUI) such as a web browser, or via the interfaces of devices such as tablets, mobile phones, smartphones and other electronic devices. The users may also interact with the system via APIs (application programming interfaces), computer batch interfaces and/or scripting tools.

As shown in FIG. 1A, input data (employee and employer information) 120 from a user 100 is sent to the computer system 130 via data network 110. The data network 110 may be any suitable data network for transmitting information such as the Internet, an intranet, an extranet, etc. It can also use other types of communication networks such as the Ethernet and can also include wired and/or wireless connections.

Furthermore, as shown in FIG. 1B, the remote computing device computer 190, in one or more configurations is able to connect directly, or through the Internet using appropriate communication protocols, to one or more account servers or computers 135 to access, change or alter data stored therein. In a further arrangement, the computer system 130 is also configured to optionally communicate with the account servers and exchange information.

Figure 3A:
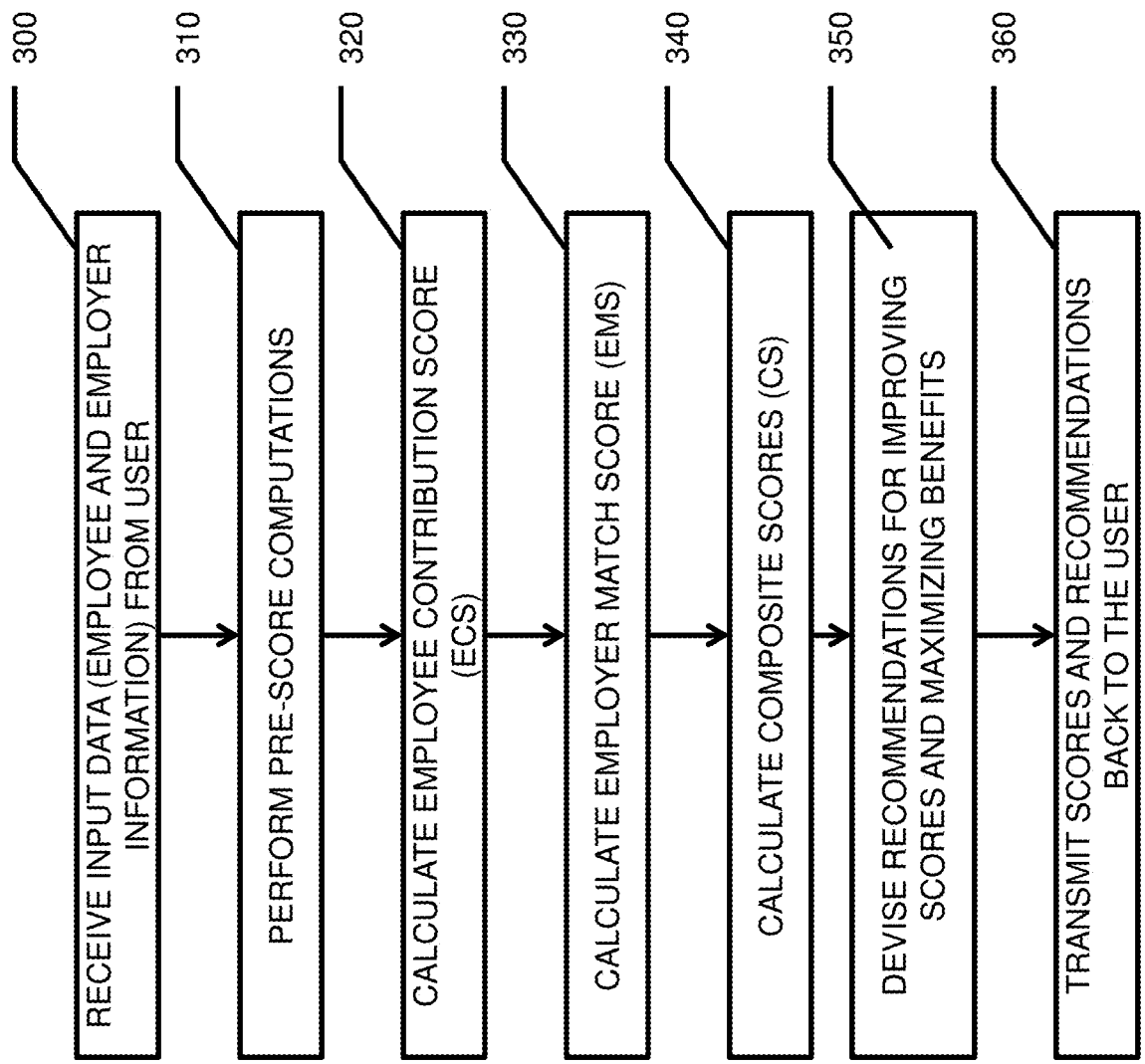
FIG. 3A is a table depicting process flow for calculating the scores and providing recommendations according to a particular embodiment.
Figure 3B:
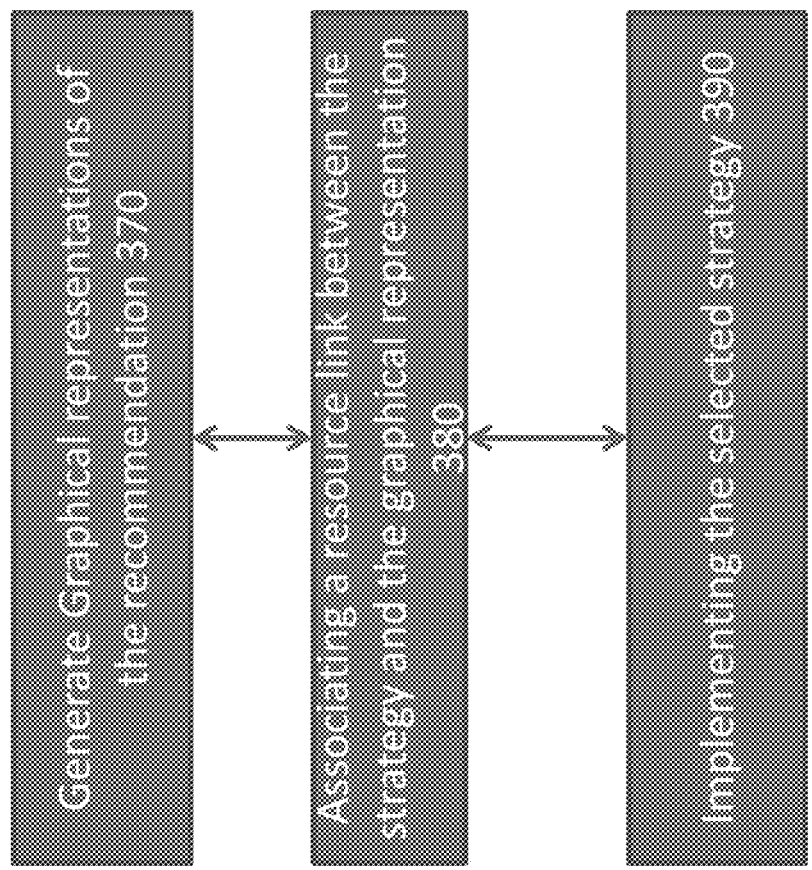
FIG. 3B is a table depicting process flow for implementing the contribution strategy in accordance with one or more embodiments.

With reference to FIGS. 3A and 3B, in one or more embodiments, the system described includes a computer system 130 properly configured by code executing therein to implement an input retrieval step 300. This input retrieval step is, in one arrangement, implemented by a series of modules or sub-modules that configure a processor thereof to access or receive data from a retirement plan participant. In a particular implementation not shown, the information accessed or received by the computer 130 in step 300 is input into a graphical user interface displayed on a remote or local computer, such as computer 190. With reference to FIG. 2, the input data consists, in a non-limiting arrangement, of employee and employer information 200 sent by the user. A general description 210 and an example 220 of the data sent by a user are also provided. For example, the computer system 130 receives input data (employee and employer information) from the user. The scores are calculated using the input data. For example, the input data 200 is used by the computer system 130 to calculate scores and devise recommendations, which are then, transmitted 180 to the user via data network 110. Likewise, Annual compensation data is used. This is the total eligible compensation for the year. This typically includes salary, bonus, and commissions. Other data sets and values used are:

How often the employee is paid—This is the payment cycle. Typical values can include Weekly, Bi-Weekly, Monthly, Bi-Monthly, Annually. Number of pay checks remaining for the year—The number of pay checks that are remaining for the rest of the year. YTD employee contribution—The year-to-date contribution made by the employee. Current employee contribution rate—The current rate of contribution by the employee towards the retirement plan. YTD employer matching contribution—The year-to-date matching contribution made by the employer. Current employer match rate—The current rate of matching contribution provided by employer. Max employer match rate—The maximum rate of matching contribution that can be provided by employer. YTD employer non-elective contribution—The year-to-date non-elective contribution made by the employer. This typically includes any profit sharing contributions made by the employer. Employee age>=50 during the year—Will the employee be 50 years old or above during the year. Employee federal tax rate—The federal tax rate of the employee. Employee state tax rate—The state tax rate of the employee. Score calculation year—The year for which the scores are calculated. Employer Name—The name of the employer. Type of retirement plan—The type of retirement plan. The most common one is 401K. Plan permits catch-up contributions—It indicates whether the retirement plan permits catch-up contributions for employees 50 years or above.

In some other embodiments, all or a portion of the input data may be derived based on the input data received from the user. For example, the Current Employer Match Rate and the Max Employer Match Rate can be obtained by querying the database 170, and as stipulated for the given Company Name and Current Employee Contribution Rate shown in FIG. 6.

It should also be noted that in some embodiments, instead of a user supplying input data, the system can connect to another application(s)/system(s) and gather input data.

Returning to FIG. 3A, the computer system 130 is configured, using one or more modules to perform pre-score calculations as in step 310, so as to calculate the scores and devise recommendations. In one particular arrangement, the pre-score computation step 310 involves one or more modules that configured the computer system 130 to perform intermediate computations using the input data received, in order to calculate the various scores. This step also includes comparing some of the input values against the limits specified by the IRS for the given year and retirement plan and making any necessary adjustments for performing the various calculations.

As examples, some of the values computed at this step can include:

'Maximum annual compensation to be used'—This is calculated based on the annual compensation received as input data 120 and checking against the annual compensation limit specified in the database 170, and as stipulated by the IRS for the given retirement plan and year provided in FIG. 4.

'Compensation per pay check'—This is calculated based on 'maximum annual compensation to be used' and the input data on 'how often the employee is paid'

'Effective employee elective deferral limit' and 'Effective overall contribution Limit' are calculated based on the limits specified in the database 170, and as stipulated by the IRS for the given retirement plan, year and age of the employee shown in FIG. 4.

'Total amount expected to be contributed from now till the end of year' is based on 'compensation per pay check', 'employee contribution rate' and 'effective number of pay checks remaining to reach contribution limit for the year'.

'Total amount expected to be contributed for the year' is the sum of 'YTD employee contribution' and 'Total amount expected to be contributed from now till the end of year'

'Max theoretical employer matching contribution that can be obtained for the year' is the product of the 'Maximum annual compensation to be used' and 'Max employer match rate' and is also checked against any Employer match limit specified in the database 170, as stipulated for the given company and retirement plan shown in FIG. 6.

'Total expected employer match from now till the end of year' is the product of 'Compensation per pay check', 'Current employer match rate' and 'Effective number of pay checks remaining to reach contribution limit for the year'

'Total amount expected to be matched for the year' is the sum of 'YTD employer matching contribution' and 'Total expected employer match from now till the end of year'.

The results of the calculations generated in step 310 are used by a properly configured computer system 130 to perform Employee Contribution Score (ECS) calculations, as shown is step 320. Here, the processor is configured to generate a value or values corresponding to the level of contribution made by the employee relative to the maximum contribution allowable under law. ECS is calculated by dividing the 'total amount expected to be contributed for the year' by the 'effective employee elective deferral limit' and then multiplying by 100, as shown by the equation below:

$$ECS=(\text{'Total amount expected to be contributed for the year'}/\text{'Effective employee elective deferral limit'})*100$$

Additionally, the processor is configured to generate an Employer Match Score (EMS), as in step 330. The computer system 130 is configured to generate one or more values which represents the level of matching contribution expected to be received from the employer relative to the maximum matching contribution that can be obtained from the employer and is calculated by dividing the 'total amount expected to be matched for the year' by 'max theoretical employer matching contribution that can be obtained for the year' and then multiplying by 100, as shown by the equation below:

$$EMS=(\text{'Total amount expected to be matched for the year'}/\text{'Max theoretical employer matching contribution that can be obtained for the year'})*100.$$

As shown in FIG. 3A, the processor is configured to implement a Composite Score (CS) generation step 340, by one or more modules executing as code within the processor. Step 340 is, in one arrangement a plurality of values depending on user preference and particular circumstances. In one embodiment, of the system and methods described, two different types of composite scores that can yield different values are generated contemporaneously, or individually. The scores provided enable or address differing approaches to generating necessary information for enabling the optimization of a retirement benefit. For example, the computer system 130 is configured to generate one or more of:

i) Composite Score Type 1 (CS_1) represents an overall score that treats contribution made by the employee and the matching contribution provided the employer equally without any differentiation. CS_1 is calculated by taking the arithmetic mean of the Employee Contribution Score (ECS) and Employer Match Score (EMS).

$$CS\_1=(ECS+EMS)/2$$

ii) Composite Score Type 2 (CS_2) represents the overall level of the total contribution made by the employee and the matching contribution received from the employer. CS_2 is calculated by taking a weighted average of the Employee Contribution Score (ECS) and the Employer Match Score (EMS). The weights are based on the 'Effective Employee Elective Deferral Limit' and the 'Max Theoretical Employer Matching Contribution that can be obtained for the year' and are calculated as follows:

Employee Contribution Score Weight (ECS_W2)=Effective employee elective deferral limit/(Effective employee elective deferral limit+Max theoretical employer matching contribution that can be obtained for the Year.

Employer Match Score Weight (EMS_W2)=Max theoretical employer matching contribution that can be obtained for the year/(Effective employee elective deferral limit+Max theoretical employer matching contribution that can be obtained for the year).

$$CS\_2=(ECS\_W2*ECS)+(EMS\_W2*EMS).$$

Thus CS_2 represents an overall score that indicates how effectively an employee is maximizing the total contribution benefit provided by the retirement plan in terms of taking advantage of the maximum amount that can be contributed for the year as well as availing the maximum matching contribution from the employer.

It should be noted that in this score, a $1 contribution made by the employee is valued the same/valued at the same level as the $1 in matching contribution received from the employer.

In the current embodiment of the invention, the scores range from 0-100. But the scores can be represented in many different numeric ranges or many different modes of ranges namely as letter grades such as A+, A, A−, B+, B, B− etc., descriptions such as High/Medium/Low etc., descriptions such as Excellent/Good/Poor etc., descriptions or colors such as Red/Amber/Green etc. The mapping indicated in FIG. 5 may be used for this purpose.

Once the scores are calculated, the one or more processors of the system described is configured by code executing therein to derive or devise recommendations for optimization of the participants retirement benefits as in step 350. In one embodiment, a suitably configured processor generates one or more recommendations, which can comprise one or more suggested changes to the user input data, for improving scores and maximizing benefits. For example, the computer system 130 is configured to calculate, through one or more modules, the additional amount the employee may contribute to maximize tax savings. Likewise, the amount of additional tax saving available to the participant, based in one implementation, on the employee's federal and state tax rates, is also calculated. In a further, non-limiting arrangement, the processor is configured to calculate any free money that is left in terms of lost matching contribution from the employer. In yet another embodiment, the system is configured by code executing in a processor thereof, to provide specific recommendation on actions or changes in user data that will result in a maximization or optimization of employee tax savings. Additionally, the maximization can take into account how to obtain the maximum matching contribution from the employer.

In one or more embodiments, the system is configured to evaluate the scores generated, using one or more machine learning algorithms or applications, such as deep learning appliances, neural networks, support vector machines, genetic algorithms, linear regression and other approaches to feature selection, feature detection, correlative data sets, or data mining. For example, the computer system 130 is configured to evaluate the scores, input data, historical data, or other information available from local and remote sources, including accessed via the Internet, to generate a ranking or hierarchy of scores and the probability that each score or generated recommendation will achieve an aim or goal of the participant.

With further reference to FIG. 3B, as shown in step 360 the computer system 130 is configured to send the scores and recommendations (including values corresponding to the additional amount that can be contributed to maximize tax savings, amount of additional tax that can be saved, free employer match left on the table and specific recommendation for maximizing tax savings and getting the maximum matching contribution from the employer) to the remote computer 190.

With reference to FIG. 3B, upon receiving the calculated scores and recommendations generated during step 360, one or more processors of the remote computer 190 is configured to generate a graphical representation that visually depicts (i) each of the contribution strategies, (ii) a graphical indicator identifying the rank or generate a hierarchy of each strategy relative to one another, as shown in step 370.

The processor of the remote device 190 is further configured to associate a resource link or data object with each contribution strategy, whereby the selection of the link or data object by the participant causes the remote device 190 to send one or more instructions to the computing device to implement the selected contribution strategy as shown in step 380 of FIG. 3B.

In one instance, the link is a formatted URL string. In another non-limiting example, the data object is JSON file that contains query data. Upon selection of the graphical representation, such as by clicking or tapping on the proposed recommendation, the URL, JSON file or data object is sent to a remote account server 135, or the computer system 130 for further processing or parsing.

With further reference and provided in step 390, the link or data object is transmitted back to the computer system 130, account server 135 or system where the object or link is parsed, inspected or implemented. In one arrangement, the data object contains the desired values for one or more participant data fields stored in a participant account server, and an authorization from the participant to make such changes.

Upon receiving such a data object or link, the relevant computing system effectuates the changes, and alters one or more factors related to the participant's retirement account or approach.

In one or more further implementations, the system described can connect to a third-party system/external system such as a retirement plan administrator system/human resources system/portfolio management system, without any manual intervention, and automatically change the employee contribution rate so that the employee contributes to the maximum allowable under law and maximize his/her tax benefits.

Furthermore, the system is configured by code executing in at least one processor thereof, the above-mentioned automated process every year without any manual intervention. This will be of invaluable benefit to the employees since they do not have to keep track of changing circumstances such as changes in compensation, change of employer, changes in employer match rules, changes in IRS contribution limits etc. and ensure that they maximize their employer match and/or contribute to the maximum allowable under law for any given year.

In a specific implementation of the system describes, the retirement optimization computer system 130 connects to third-party via secure communication protocols. Such communications protocols can include, but not limited to, methods/protocols such as http, https, sftp, message queues, remote method invocation, application programming interfaces etc. Furthermore, such communications between the computer system 130, the remote device 190 and one or more remote services (135) is encrypted prior to transmission.

Once the system makes the automated changes, the system can send notification messages to the user which can include, but not limited to, email messages/mobile phone text messages/printed confirmation statements etc.

While there exist multiple ways of implementing the steps and systems provided, several scenarios are shown in the table given below by way of non-limiting examples:

EXAMPLES

| | | Example 1 | Example 2 | Example 3 | Example 4 |
|---|---|---|---|---|---|
| Input Data | | | | | |
| | Annual Compensation | $100,000 | $100,000 | $100,000 | $100,000 |
| | How Often The Employee Is Paid | Bi-Weekly | Bi-Weekly | Bi-Weekly | Bi-Weekly |
| | Number Of Pay Checks Remaining For The Year | 26 | 26 | 26 | 26 |
| | YTD Employee Contribution | $0 | $0 | $0 | $0 |
| | Current Employee Contribution Rate | 3% | 36% | 9% | 18% |
| | YTD Employer Matching Contribution | $0 | $0 | $0 | $0 |
| | Current Employer Match Rate | 3% | 6% | 6% | 6% |
| | Max Employer Match Rate | 6% | 6% | 6% | 6% |
| | YTD Employer Nonelective Contribution | $0 | $0 | $0 | $0 |
| | Employee Age >=50 During the Year | No | No | No | No |
| | Employee Federal Tax Rate | 25% | 25% | 25% | 25% |
| | Employee State Tax Rate | 7% | 7% | 7% | 7% |
| | Score Calculation Year | 2015 | 2015 | 2015 | 2015 |

-continued

| | | Example 1 | Example 2 | Example 3 | Example 4 |
|---|---|---|---|---|---|
| | Employer Name | Company A | Company A | Company A | Company A |
| | Type of Retirement Plan | Traditional 401(k) | Traditional 401(k) | Traditional 401(k) | Traditional 401(k) |
| | Plan Permits Catch-up Contributions | Yes | Yes | Yes | Yes |
| Pre-Score Computations | | | | | |
| | All items below are calculated values | | | | |
| | Maximum Annual Compensation To Be Used | $100,000 | $100,000 | $100,000 | $100,000 |
| | Compensation Per Pay Check | $3,846 | $3,846 | $3,846 | $3,846 |
| | Employee Elective Deferral Limit | $18,000 | $18,000 | $18,000 | $18,000 |
| | Catchup Contribution Limit | $0 | $0 | $0 | $0 |
| Denominator for Calculating ECS | Effective Employee Elective Deferral Limit | $18,000 | $18,000 | $18,000 | $18,000 |
| | Theoretical Overall Contribution Limit | $53,000 | $53,000 | $53,000 | $53,000 |
| | Effective Overall Contribution Limit | $53,000 | $53,000 | $53,000 | $53,000 |
| | Total YTD Employee and Employer Contributions | $0 | $0 | $0 | $0 |
| | Current Employee Contribution Per Pay Check | $115.38 | $1,384.62 | $346.15 | $692.31 |
| | Current Employer Match Per Pay Check | $115.38 | $ 230.77 | $230.77 | $230.77 |
| | Total Amount Expected To be Contributed From Now Till End of Year | $3,000 | $18,000 | $9,000 | $18,000 |
| Numerator for Calculating ECS | Total Amount Expected To Be Contributed For The Year | $3,000 | $18,000 | $9,000 | $18,000 |
| Denominator for Calculating EMS | Max Theoretical Employer Matching Contribution That Can Be Obtained For The Year | $6,000 | $6,000 | $6,000 | $6,000 |
| | Total Expected Employer Match From Now Till End Of Year | $3,000 | $3,000 | $6,000 | $6,000 |
| Numerator for Calculating EMS | Total Amount Expected To Be Matched For The Year | $3,000 | $3,000 | $6,000 | $6,000 |
| Calculate ECS | | | | | |
| | Employee Contribution Score (ECS) | 17 | 100 | 50 | 100 |
| Calculate EMS | | | | | |
| | Employer Match Score (EMS) | 50 | 50 | 100 | 100 |
| Calculate Composite Scores | | | | | |
| CS_1 | | | | | |
| | Employee Contribution Score Weight | 0.5 | 0.5 | 0.5 | 0.5 |

-continued

|  |  | Example 1 | Example 2 | Example 3 | Example 4 |
|---|---|---|---|---|---|
| CS_2 | Employer Match Score Weight | 0.5 | 0.5 | 0.5 | 0.5 |
|  | Composite Score Type 1 (CS_1) | 33 | 75 | 75 | 100 |
|  | Employee Contribution Score Weight | 0.75 | 0.75 | 0.75 | 0.75 |
|  | Employer Match Score Weight | 0.25 | 0.25 | 0.25 | 0.25 |
|  | Composite Score Type 2 (CS_2) | 25 | 88 | 63 | 100 |
| Devise Recommendations |  |  |  |  |  |
|  | Additional Amount That Can Be Contributed To Maximize Tax Savings | $15,000 | $0 | $9,000 | $0 |
|  | Amount of Additional Tax That Can Be Saved | $4,800 | $0 | $2,880 | $0 |
|  | Free Employer Match Left On The Table | $3,000 | $3,000 | $0 | $0 |
|  | Recommendation For Getting The Maximum Matching Contribution From The Employer | Increase Current Employee Contribution Rate from 3% to 6% | Decrease Current Employee Contribution Rate from 36% to 6% | No Change Required | No Change Required |
|  | Recommendation For Maximizing Tax Savings | Increase Current Employee Contribution Rate from 3% to 18% | Decrease Current Employee Contribution Rate from 36% to 18% | Increase Current Employee Contribution Rate from 9% to 18% | No Change Required |
|  | Recommendation For Getting The Maximum Matching Contribution From The Employer As Well As Maximizing Tax Savings | Increase Current Employee Contribution Rate from 3% to 18% | Decrease Current Employee Contribution Rate from 36% to 18% | Increase Current Employee Contribution Rate from 9% to 18% | No Change Required |

The invention thus not only provides scores that are descriptive of the current situation of an employee but also delivers additional value by providing specific recommendations on how the employee can improve his/her retirement benefits.

It should also be noted that the system can be used to generate scores for any year for which input data is available. For example, the system can be used to generate scores for past years giving an employee the capability to understand how he/she performed historically. These scores may be plotted on a graph or represented as a chart. Additionally, the users of the system can generate scores for one or more employees for one or more years for one or more companies to do analyses and studies that can include but not limited to how an employee or employees performed year-over-year in terms of their own contribution, matching contribution from the employer, any free money they left on the table. This can be useful in devising policies to help employees save more and have a secure retirement life.

It may be noted that in some embodiments, the system may be deployed on a cloud environment, which a user can access via a data network, pass input data, and get scores and recommendations from the system.

In other embodiments, a user can download, deploy and run the whole system as an application on a mobile device such as a cell phone, smartphone, tablet device or other such handheld devices or on a computer device such as a laptop, desktop, server etc.

In some other embodiments, another application such as a third-party application can access the system, pass input data, and get scores and recommendations from the system, which the third-party application may then use for its own purposes such as displaying to its users.

In yet another embodiment, a computer batch program requiring scores and recommendations for one or more employees, may access the system, pass input data pertaining to one or more employees, and get scores and recommendations from the system for the said one or more employees.

The scores and recommendations created by the system may be displayed on the screens of one or more electronic devices and/or printed on paper. The scores and recommendations may also be stored as electronic files, transferred or shared between computers, or projected onto a screen during presentations.

It should be understood that the manner in which the system is deployed, accessed, and/or how the scores and recommendations generated by the system are displayed or used, are in no way a limitation on the utility, novelty, or inventiveness of the system.

The computer system described herein can be developed to run on a wide variety of operating systems including but not limited to various versions of APPLE IOS, APPLE OS X, ANDROID, WINDOWS, UNIX, LINUX and other operating systems. The capability of the system is in no way dependent upon or limited by the underlying operating system used.

The computer methods used for calculating the scores and devising the recommendations can be developed by a computer programmer/developer skilled in the art. The computer methods may be implemented in a variety of programming languages including but not limited to SWIFT, OBJECTIVE-C, JAVA, C#, .NET, C++, PERL, PYTHON and other programming languages. The capability of the system is in no way dependent upon or limited by the underlying programming language used.

Some of the figures included herein depict flow charts/diagrams that may show a particular logic flow indicating the execution of a particular logic. It must be noted that the particular logic flow merely provides an exemplary implementation of the general functionality described herein. Additionally, the particular logic flow does not necessarily have to be executed in the same order indicated unless otherwise stated. Furthermore, the particular logic flow may be implemented by a hardware component, a software component executed by a computer, a firmware component embedded in hardware, or any combination thereof.

The computer system described herein may consist of one or more processors, communicating with one or more memory units and one or more databases, via one or more data circuits. The data circuits may carry electrical signals between the processor(s), the memory unit(s) and the database(s).

The executable instructions that cause the computer system to execute the various methods for calculating the scores and devising recommendations can be stored and delivered in any type of computer-readable format including but not limited to a hard drive, pen drive, flash drive, optical drive or CD-ROM. The executable instructions may also be downloaded from a remote location to a user's computer via a wired or wireless network. This does not imply that the executable instructions take the form of a signal or other intangible form.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter of the present invention have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Publications and references to known registered marks representing various systems are cited throughout this application, the disclosures of which are incorporated herein by reference. Citation of the above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

The above descriptions of embodiments of the present invention are not intended to be exhaustive or to limit the systems and methods described to the precise form disclosed. While specific embodiments of, and examples for, the apparatus are described herein for illustrative purposes, various equivalent modifications are possible within the scope of other articles and methods, as those skilled in the relevant art will recognize. The teachings of articles and methods provided herein can be applied to other devices and arrangements, not only for the apparatus and methods described above.

The elements and acts of the various embodiments described above can be combined to provide further embodiments. These and other changes can be made to the apparatus and methods in light of the above detailed description.

What is claimed is:

1. A system for calculating employee retirement optimization comprising:

an optimization computer having one or more processors configured by code executing therein to access account contribution data relating to an account held by a participant in a retirement plan wherein the accessed data is less than one year old, and derive, based on the accessed data, one or more values indicative of the current status of one or more features of the account, and a hierarchy of proposals to maximize one of the one or more features of the retirement account for the current calendar year, wherein deriving the hierarchy of proposals includes accessing one or more values corresponding to current contributions made within the current year to the account by the participant and one or more values corresponding to a maximum possible contribution made to the account by the participant for the current year and to transmit such a derived hierarchy and the one or more values indicative of the current status of one or more features of the account;

an evaluative system configured to rank the hierarchy of proposals using a machine learning model trained on a historical data set for one or more participants, wherein the hierarchy of proposals are provided as an input to the machine learning model and a probability is generated for each of the hierarchy of proposals that that corresponds the likelihood that the each of the hierarchy of proposals will meet the contribution goal of the participant;

a remote device configured to receive the one or more values indicative of the current status values and the hierarchy of retirement proposals and generate in response to the transmission, (i) a plurality of graphical elements for each of the received one or more values indicative of the current status values wherein each of the received one or more values indicative of the current status values is assigned a non-numerical graphical element corresponding to a pre-determined range of values for the one or more values indicative of the current status values, and (ii) a graphical representation of each particular retirement proposal of the hierarchy of retirement proposals, whereby upon selection of a particular graphical representation of a particular retirement proposal, a Javascript Object Notation (JSON) data object including at least an instruction set for instructing a processor and values correlated to changes in one or more parameters of the account is generated and sent via a communication channel to a retirement account computing device; and a retirement account computing device remote from the remote device and configured by one or more processors executing therein to receive the generated JSON data object and implement the instructions thereof to parse the values to implement a change in one or more data values corresponding to the current retirement account of the participant that initiated the instruction transmission and generate a notification message for transmission to the remote device indicating the change made to the one or more data values.

2. The system of claim 1, wherein the retirement optimization computer is configured to access a remote third-party computer system.

3. The system of claim 2, wherein the remote third party system is one of a retirement plan administrator system, a human resources system, a portfolio management system, or a social network, or a messaging system.

4. The system of claim 2, is further configured to access, from the third-party-system, a historical dataset covering at least one prior year for the participant, the historical dataset including a value corresponding to a prior contribution limit for the participant a given prior year, the prior contribution amount made by the participant in the given prior year, a matching limit for the participant that specifies the amount that the participant's employer would match a contribution to the retirement account of the participant for the prior given year, and the amount actually matched by the employer in the prior given year, generate, one or more non-numerical indicators corresponding to the difference between the historical dataset for the participant and the current participant data.

5. A computerized method for maximizing contributions to employee retirement plans, comprising:

receiving, by a processor of a computing device, an input data set for a given employee that includes at least: (i) participant data, (ii) a contribution limit for the participant that specifies a total amount the participant may contribute to a tax-savings retirement account, (iii) a current contribution amount that specifies the total amount that the participant has contributed to a retirement account for the current year, (iv) a matching limit for the participant that specifies the amount that the participant's employer will match a contribution to the retirement account of the participant for the current year, and (v) a current matching amount that specifies the matching amount that the employer has already contributed to the retirement account of the participant for the current year;

generating, by the processor of the computing device, at least: (i) one employer contribution maximization value indicating the differential between the maximum employee matching funds and the amount of funds presently contributed to the retirement account by the employer; and (ii) at least one tax savings maximization value being derived from at least a comparison of a total amount permitted in a tax savings retirement account and the current amount contributed to the retirement account by the employee;

devising, by the processor of the computing device, a plurality of contribution strategies that include at least one contribution strategy to (i) minimize the employer contribution maximization value, at least one contribution strategy to (ii) minimize the tax savings maximization value, and at least one contribution strategy to (iii) achieve the smallest possible value of both (i) and (ii), wherein the computing device is further configured to rank the devised strategies based on (a) the participant data and (b) a likelihood that the each of the devised strategies will meet the contribution goal of the participant, the likelihood determined by providing a historical data set for the participant to one or more machine learning applications configured to generate a likelihood of success value based on a correlation between the devised strategy and the historical data;

transmitting, by the computing device, the plurality of contribution strategies, the employer contribution maximization value and tax saving maximization value to a remote computing device over the Internet using a communication channel, generating, by the remote computing device on a display connected thereto, a graphical representation that visually depicts (i) the tax saving maximization value and the employer contribution maximization value, each as one of a plurality of non-numerical visual indicators, wherein each non-numerical visual indicator corresponds to a pre-determined range of values, and (ii) each of the plurality of contribution strategies, wherein each of the visually depicted plurality of contribution strategies is provided with a graphical indicator identifying the relative amount of improvement each strategy will impart to the tax savings maximization value and the contribution maximization value if implemented;

associating, with the remote computing device, a resource link associated with each depicted contribution strategy, wherein selection of the link causes the remote computing device to generate at least one Javascript Object Notation (JSON) file including at least an instruction set for instructing a processor and values correlated to changes in one or more parameters of the account and send the at least one data object to a retirement account computing device configured by one or more processors to implement the selected contribution strategy according to the instructions provided in the at least one JSON file.

6. The method of claim 5, further comprising:

receiving, by an account management computing device, at least one JSON file from the remote computing device and an authorization from the participant to implement the change in the retirement plan; and accessing, by the account management computing device, one or more accounts on an account server over the Internet, belonging to the participant and for which user authorization has been provided and implementing the instructions contained within the at least one JSON file for altering one or more values associated with the account of the participant.

7. The method of claim 5, wherein the employer contribution maximization value is derived using at least the current participant contribution amount and the current participant contribution rate.

8. The method of claim 6 wherein the accessing step further comprises accessing the server through a security layer.

9. The method of claim 5 further comprising, generating a combined score value according to:

$$CS=(ECSW2*ECS)+(EMSW2*EMS),$$

where ECSW2 is a value representing the effective employee elective deferral limit/(effective employee elective deferral limit+maximum theoretical employer matching contribution that can be obtained for the year) and EMSW2 is a value representing a maximum theoretical employer matching contribution that can be obtained for the year/ (effective employee elective deferral limit+maximum theoretical employer matching contribution that can be obtained for the year), EMS corresponds to the employer contribution maximization value and ECS corresponds to the tax savings maximization value, and transmitting the combined score value along with the employer contribution maximization value and tax savings maximization.

10. The computerized method of claim 5, wherein the participant data includes one of: the total eligible compensation for the year including salary, bonus, and commissions; payment cycle selected from a group including Weekly, Bi-Weekly, Monthly, Bi-Monthly, and Annually; number of pay checks that are remaining for the rest of the year; year-to-date contribution made by the employee; current rate of contribution by the employee towards the retirement plan; year-to-date matching contribution made by the employer; current rate of matching contribution provided by the employer; maximum rate of matching contribution that can be provided by the employer; year-to-date non-elective contribution made by the employer including any profit sharing contributions made by the employer; Employee age>=50 during the year; federal tax rate of the employee; state tax rate of the employee; year for which the scores are calculated; name of the employer; type of retirement plan opted the most common one is 401K; and whether plan permits catch-up contributions for employees 50 years or above according to specific retirement plan.

11. A computer implemented method for altering contributions to employee retirement plans, comprising:

providing a contribution optimization application to a retirement plan participant for installation on a remote computing device;

accessing, by a contribution management server, account data stored in one or more remote account servers, the account data relating to one or more retirement plans available to a participant and current compensation data relating to the participant, wherein the account data further includes data relating to a contribution limit for the participant that specifies a total amount the participant may contribute to a tax-savings retirement account, a current contribution amount that specifies the total amount that the participant has contributed to a retirement account for the current year, a matching limit for the participant that specifies the amount that the participant's employer will match a contribution to the retirement account of the participant for the current year and a current matching amount that specifies the matching amount that the employer has already contributed to the retirement account of the participant for the current year;

generating, by the remote computing device, at least one employer contribution value and at least one tax savings value;

accessing a historical dataset covering at least one prior year for the participant, the historical dataset including a value corresponding to a prior contribution limit for the participant a given prior year, the prior contribution amount made by the participant in the given prior year, a matching limit for the participant that specifies the amount that the participant's employer would match a contribution to the retirement account of the participant for the prior given year, and the amount actually matched by the employer in the prior given year, deriving one or more trends corresponding to the changes over time in the historical dataset for the participant;

devising, by the remote computing device, at least one contribution strategy to achieve at least one of (i) maximizing the tax saving value of the participant, (ii) maximizing the employer contribution value of the employer, (iii) optimizing (i) and (ii) so as to achieve a maximal possible value for both (i) and (ii) or (iv) a change in a derived trend, wherein the computing device is further configured to rank the devised strategies based on (a) at least the historical participant data and (b) a likelihood that the each of the devised strategies will meet the contribution goal of the participant, the likelihood determined by accessing a historical data set for the participant and providing the historical dataset to one or more machine learning applications configured to correlate the historical data set and then providing each of the devised strategies to the machine learning application in order to generate a value for each of the devised strategies of proposals based on the historical datasets;

generating, by the remote computing device, one or more account changes associated with each of the devised contribution strategies wherein each account change is configured to implement the associated contribution strategy;

transmitting, by the remote computing device, the contribution strategy and associated account changes to the remote device over a communications channel, generating, by the remote computing device on a display connected thereto, a graphical representation that visually depicts (i) each of the contribution strategies and (ii) a graphical indicator identifying the rank of each strategy relative to one another; and implementing, with the remote computing device, the account change upon selection of a visual element associated with a contribution strategy, by generating a Javascript Object Notation (JSON) file including at least an instruction set for implementing the account changes associated with the contribution strategy and a user authorization, the remote computing device further establishing a direct connection between the remote computing device and the one or more account servers; transmitting the JSON file containing the instruction set for implementing the account changes to the one or more account servers, wherein upon receipt of the JSON file, the one or more account servers are configured to cause one or more values related to a participant account to change according to the provided instruction set, for which user authorization has been provided, and generate a notification message for transmission to the remote computing device indicating the change made to the one or more data values.

12. The method of claim 11, wherein generating at least one tax savings value includes calculating an Employee Contribution Score (ECS) representative of the level of contribution made by the participant relative to the maximum contribution allowable under an applicable regulation.

13. The method of claim 12, wherein the ECS is calculated as ('Total amount expected to be contributed for the year'/'Effective employee elective deferral limit')*100.

14. The method of claim 11 wherein generating the contribution values includes calculating an Employer Match Score (EMS) representing the level of matching contribution expected to be received from the employer of a participant relative to the maximum matching contribution that can be obtained from the employer.

15. The method of claim 14, wherein the EMS is calculated as EMS=('Total amount expected to be matched for the year'/'Max theoretical employer matching contribution that can be obtained for the year')*100.

16. The method of claim 11, further comprising calculating a combined score (CS) derived from at least an Employee Contribution Score (ECS) representative of the level of contribution made by the participant relative to the maximum contribution allowable under an applicable regulation and an Employer Match Score (EMS) representing the level of matching contribution expected to be received from the employer of a participant relative to the maximum matching contribution that can be obtained from the employer.

17. The method of claim 16, wherein the combined score (CS) is calculated according to:

$$CS=(ECSW2*ECS)+(EMSW2*EMS),$$

where ECSW2 is a value representing the effective employee elective deferral limit/(effective employee elective deferral limit+maximum theoretical employer matching contribution that can be obtained for the year) and EMSW2 is a value representing a maximum theoretical employer matching contribution that can be obtained for the year/ (effective employee elective deferral limit+maximum theoretical employer matching contribution that can be obtained for the year).

18. A computer-based method of claim 11 wherein the contribution strategy devised includes altering the amount the employee may contribute to maximize employer match and/or tax savings, calculating the amount of additional tax that can be saved based on the employee's federal and state tax rates and the amount of money that is left in terms of lost matching contribution from the employer.

* * * * *